Patented Nov. 24, 1925.

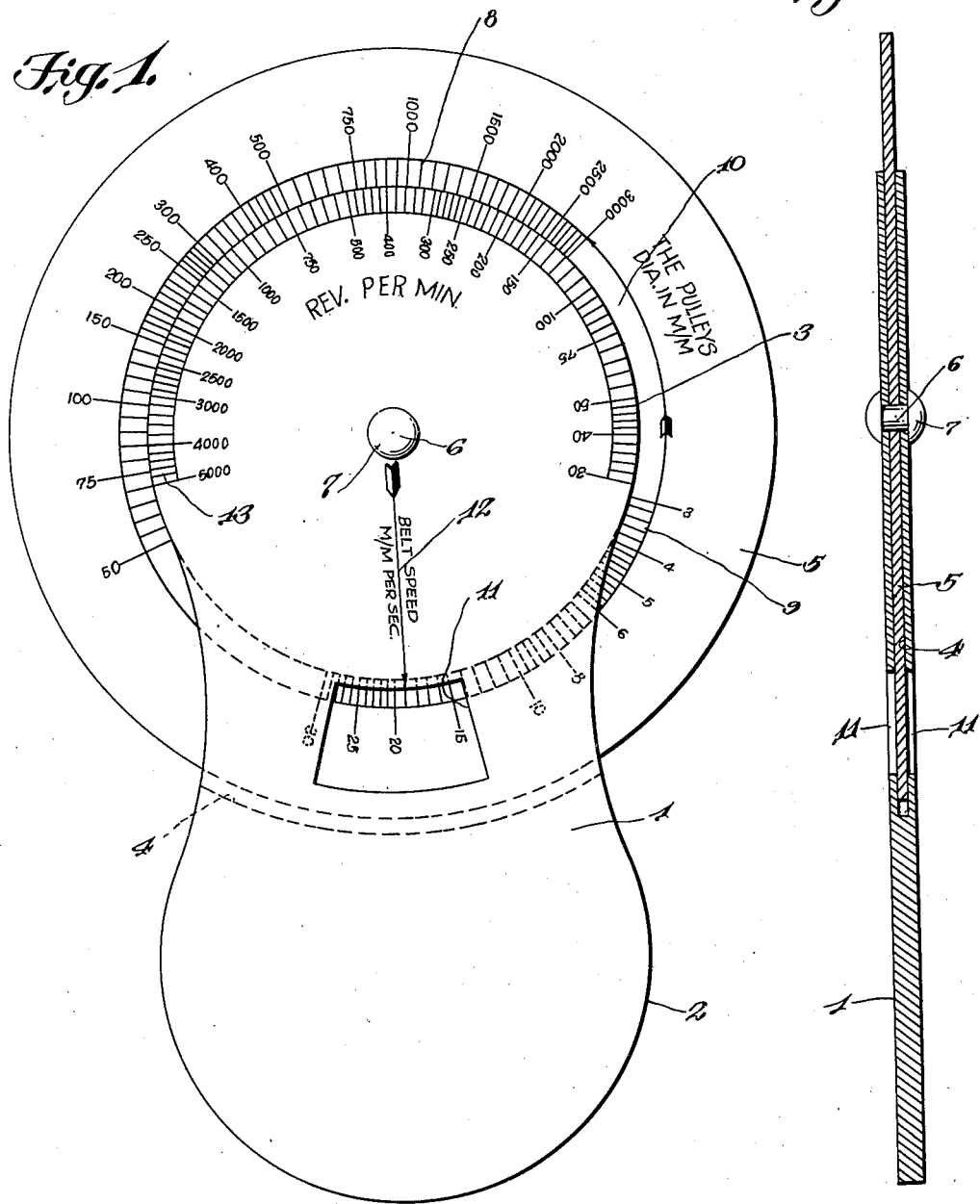

1,563,284

UNITED STATES PATENT OFFICE.

GERHARD LAURIN, OF EVANSTON, ILLINOIS.

COUNTER FOR PULLEYS.

Application filed February 8, 1924. Serial No. 691,452.

*To all whom it may concern:*

Be it known that I, GERHARD LAURIN, a naturalized citizen of the United States, residing at Evanston, in the county of Cook and State of Illinois, have invented new and useful Improvement in Counters for Pulleys, of which the following is a specification.

This invention relates to new and useful improvements in counters for pulleys and more particularly to a device for ascertaining the diameters of certain pulleys and the number of revolutions per minute. The main object of the present invention is the provision of a counter for pulleys whereby the diameter of certain pulleys may be ascertained when the diameter and revolutions per minute is given of another pulley to which the first pulley is attached through the medium of a belt and also indicate the speed of the belt between the two pulleys.

Another object of the present invention is the provision of a device of the above character which can be quickly and readily operated to ascertain the belt speed between the two pulleys and also indicate the proper diameter of a pulley to be used with another pulley, the diameter and revolutions per minute of which is known in order to provide the proper sized pulleys for driving a belt at the required speed.

With the above and other objects in view the invention consists in the novel features in construction, the combination and arrangement of parts hereinafter more fully set forth, pointed out in the claim and shown in the accompanying drawings, in which:—

Fig. 1 is a side elevation of a counter for pulleys constructed in accordance with my invention.

Fig. 2 is a longitudinal section.

In carrying out my invention I provide a holder or support the body 1 of which is preferably elongated in form having arcuate end portions 2 and 3, the end 3 being split longitudinally of the body to provide a receiving recess 4 for the counter disc 5. This counter disc is positioned centrally with respect to the arcuate end 3 and mounted for rotation therein by means of the bearing pin 6, the ends of which are upset or riveted as shown at 7 for retaining the two side portions of the end 3 and the disc 5 in proper relative positions.

The disc 5 is provided at one side thereof with a plurality of graduations indicated at 8, said graduations running in value from 50 to 3,000, said graduations indicating the diameters of various sized pulleys in millimeters.

The disc 5 is also provided with a plurality of graduations 9 arranged upon the opposite side of the center of the disc 5 with respect to the graduations 8, and these graduations 9 are provided with numerals ranging from 3 to 30 so as to indicate the various speeds of belts between two operating pulleys and it will be apparent that both of the sets of graduations 8 and 9 are circumferentially arranged upon the disc 5 within a circle 10 which is positioned adjacent the arcuate perimeter of the end 3 of the holder.

The body 1 of the holder is provided with a sight opening 11 and positioned substantially centrally of the sight opening at one side thereof is suitable indicating indicia 12 which cooperates with the graduations 9 to correctly indicate the number of revolutions of the belt around two pre-determined sized pulleys.

The arcuate end 3 of the body 1 is provided adjacent its perimeter upon one face thereof with a plurality of graduations 13 which are numbered from 30 to 5,000 and are used for indicating the number of revolutions per minute of different sized pulleys.

It will be apparent from the foregoing that if a party desires to connect two pulleys by means of a belt and desires to have this belt travel at a pre-determined rate of speed, the counter will readily indicate the size of the second pulley which is to be used in connection with the pulley, the diameter of which is known, and in order to do this, the disc 5 is rotated relative to the arcuate end of the body 1 and if for example the diameter of the first pulley is 180 millimeters and the revolutions of this pulley per minute is 2,000, the graduation number 2,000 of the series 13 is positioned opposite 180 of the series of the graduations 8. Now if it is desired to have the second pulley revolve at a rate of 400 revolutions per minute, the required size of the pulley will be indicated opposite the number 400 in the series 13 on the end 3, thus it will be noted that 900 appears on the series 8 opposite 400 indicating that the second pulley must be 900 millimeters in diameter.

By positioning the disc as indicated above, the rate of speed of the belt will be given on the series of graduations 9, the indicating indicia being positioned opposite 19.

It will be apparent from the foregoing that if a party desires to have a belt traveling at a certain rate of speed, the disc 5 and end 3 will readily indicate the desired pulleys to be used for imparting this rate of speed to the belt. For instance if it is desired to have the belt travel at a rate of 19 revolutions per minute, the indicia arrow 12 is positioned opposite the graduation 19 of the series 9 and the proper pulley diameters will appear in the graduations of the series 8 in accordance with the number of revolutions per minute of the size of pulleys desired.

While I have shown and described the preferred form of my invention I wish it to be understood that various changes and alterations may be carried out during the manufacture of the same without departing from the spirit of the invention or the scope of the appended claim.

Having thus described my invention what I claim is:—

A counter for pulleys including an elongated body having spaced arcuate end portions, one of said end portions forming a handle and the other end portion being split longitudinally to form a receiving recess, a counter disc in said recess, a pin traversing the center of the arcuate ends and the disc for rotatably mounting the disc, one of said end portions having a series of graduations extending inwardly from its edge, graduations on the disc cooperating with the graduations on the arcuate end portions, a second set of graduations on the disc opposite the first set of said body having a side opening to display the second set of graduations on the disc at a point centrally of the body.

In testimony whereof I affix my signature.

GERHARD LAURIN.